March 13, 1945.  W. H. JORDAN  2,371,243
PITOT-STATIC TUBE TESTING CONNECTION
Filed Oct. 25, 1943
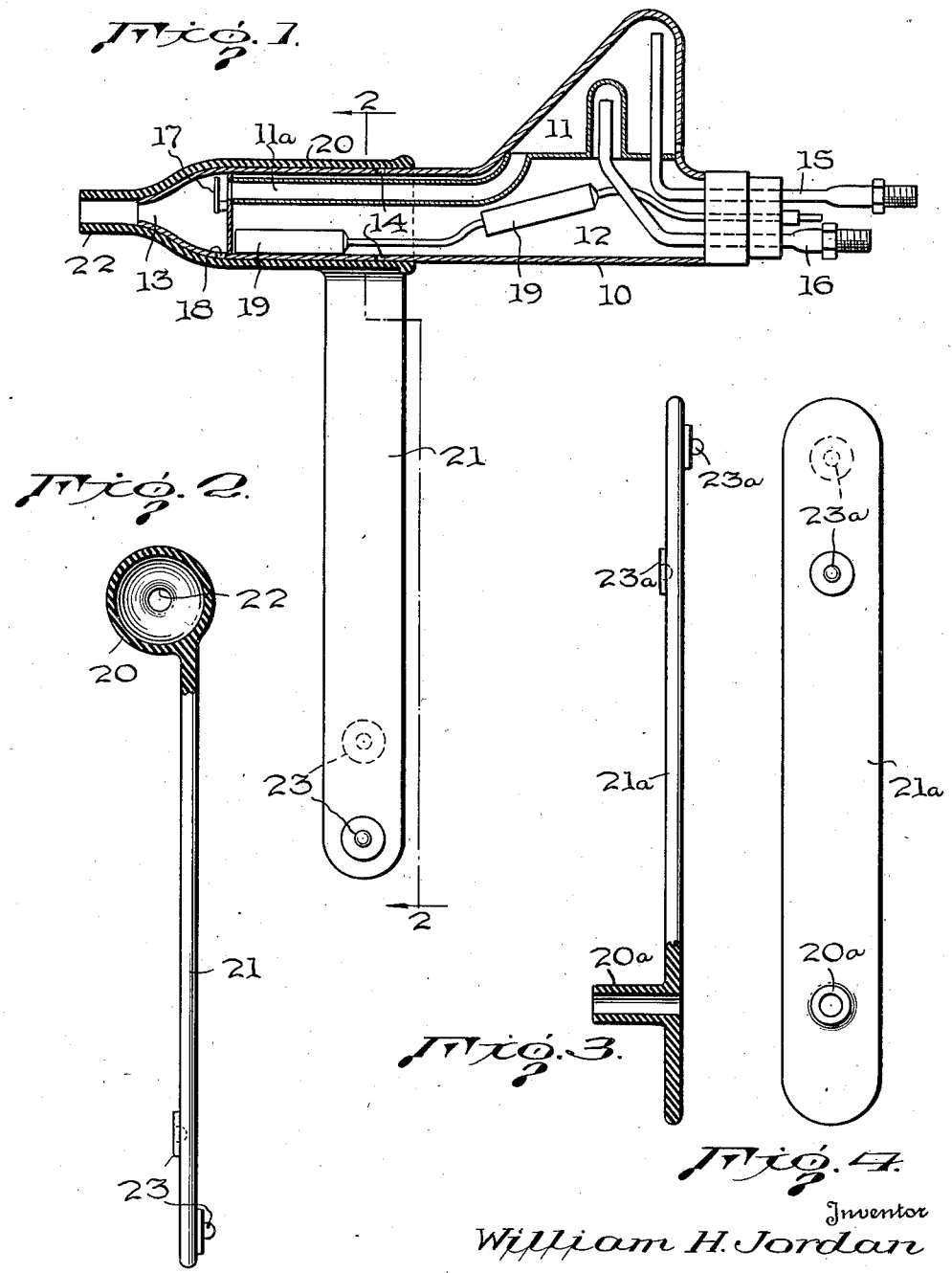
Inventor
William H. Jordan
By Church & Church
His Attorneys Patented Mar. 13, 1945

2,371,243

UNITED STATES PATENT OFFICE 2,371,243

PITOT-STATIC TUBE TESTING CONNECTION

William H. Jordan, Kansas City, Mo.

Application October 25, 1943, Serial No. 507,577

9 Claims. (Cl. 73—3)

This invention relates to improvements in connecting appliances for facilitating the testing of Pitot-static tubes used on aircraft in association with the air-speed and the altimeter or "rate of climb" indicators of instruments of the aircraft.

It is, of course, customary to test these tubes and their associated instruments and, in doing so, means must be provided for connecting a testing hose or air line to the tubes. Various types of connectors have been proposed for this purpose, but each has been more or less objectionable for various reasons, such as lack of adaptability to different sizes of tubes; original and replacement costs of the connector itself; inability to seal the connection with the tube; and the bulkiness or weight of the clamping or attaching means used.

The primary object of the present invention, therefore, is to provide an attachment or appliance for connecting a testing hose to Pitot-static tubes of different sizes and which may be readily clamped or sealed to said tubes without the use of cumbersome or expensive fastening means. It is also the object of the invention to provide a connecting attachment which can be produced economically, thus minimizing the original and replacement costs of the attachment.

In its broader aspect, the invention contemplates the testing of both the dynamic pressure chamber and the static chamber of Pitot-static tubes by providing an attachment or connection having means for securely fastening it on the tube, notwithstanding the fact that the connection may have formed as a part thereof different types of air passage, depending upon whether the testing hose is to be connected to the dynamic pressure chamber or to the static chamber of the tube.

A still further object of the invention is to provide a testing hose connection for the entry opening of the dynamic pressure chamber of a Pitot-static tube and which will, at the same time, properly seal the entry opening of the static chamber of the tube.

With these and other objects in view, the invention consists in certain details of construction and combinations and arrangements of parts, all as will hereinafter be more fully described and the novel features thereof particularly pointed out in the appended claims.

In the accompanying drawing,

Figure 1 is a sectional view taken longitudinally of a Pitot-static tube with the present connection for the dynamic pressure chamber installed but not fastened thereon, the interior of said tube merely being illustrated diagrammatically as it forms no part of the present invention;

Fig. 2 is a sectional view through the connecting attachment or appliance, this view being taken in a plane indicated by the line 2—2 of Fig. 1.

Fig. 3 is a view similar to Fig. 2, illustrating the connecting appliance for testing the static chamber of the tube; and Fig. 4 is a plan view of the connector shown in Fig. 3.

As is understood, the usual Pitot-static tube 10 illustrated in Fig. 1 has its interior divided into a dynamic pressure chamber 11 and a static chamber 12. One end of the tube is closed and the opposite end is of reduced diameter and forms an air opening or inlet 13 for the dynamic pressure chamber 11, while the static chamber 12 is open to the atmosphere through one or more openings or holes 14 in the side of the tube. Air entering inlet 13 does not have access to the static chamber 12. The pressure in dynamic pressure chamber 11 is transferred to an air-speed indicator (not shown) by an air tube 15, and the static chamber 12 is connected by an air tube 16 to an altimeter or "rate of climb" indicator (not shown), these two air tubes 15 and 16 extending from the Pitot-static tube 10 through the closed end of the latter. Within the tube 10 there is a baffle 17 at the end of the dynamic pressure tube 11ª, which, in a sense, forms part of the dynamic pressure chamber 11, and a drain opening 18 is also provided in the wall of tube 10 in advance of the partition or front wall of the static chamber. Electrical resistance units 19 are also provided within the tube 10 to prevent the tube icing, as it is usually located at the leading edge of an outboard wing section of the aircraft. This construction of the Pitot-static tube forms no part of the present invention and, hence, only a general description has been given merely in order that the use and advantages of the present appliance may be more readily understood and appreciated.

When it is desired to test the pressure chambers of tube 10 and the instruments connected by lines 15 and 16 to said chambers, it is necessary to connect an air line to the entry openings of said chambers. For this purpose, the present invention contemplates the use of an attachment or connection that might be generally described as comprising a tubular body portion which constitutes an air passage adapted to register with the entry opening of the chamber to be tested, and a tape-like, elastic extension 21 on said body portion adapted to be secured in sealing engagement around the tube 10.

For instance, the attachment for connecting an air line (not shown) to the entry opening 13 of the dynamic pressure chamber 11, as shown in Figs. 1 and 2, consists of a tubular body portion 20 which can be telescoped or inserted over the open end of tube 10, and an elongated tape-like portion 21 which is disposed tangentially of the said tubular body and which can be wrapped around said tube 10. Preferably, the entire attachment is made of dipped or elastic rubber, so that the tubular body portion 20 can be fitted tightly to tubes of different sizes or cross-sectional shapes and the portion 21 can be wrapped around the tube under tension to make a better seal. The end 22 of the tubular portion may be made of reduced cross section and serves as an elastic nipple to which air lines of different diameters can be readily attached, with a substantially perfect seal. For temporarily retaining the tape portion 21 wrapped around the tube 10, fastening elements, for instance, snaps 23, can be embedded in the end of said tape-like portion. Preferably, the length of the tubular portion 20 is such that it will extend over and seal the drain opening 18 and, preferably, the air entry openings 14 of the static chamber, as it is important that this chamber be protected from high pressures used in testing Pitot tubes. Of course, these openings 14 can be closed by covering them with the wrappings of the tape-like portion 21 of the attachment, in which event the tubular portion may be made of a reduced length.

The attachment for testing the static chamber and connected instruments is illustrated in Figs. 3 and 4 and consists of a tubular body portion 20a and a tape-like portion 21a. In this instance, the tubular portion 20a is placed over one of the openings 14 in tube 10 and the tape portion 21a wrapped around the tube, but over any additional openings 14, if there are more than one of the latter in the tube wall. Fasteners 23a are provided for securing the convolutions of the wrapped tape around the tube. In this instance, portion 20a serves as a nipple for attaching the testing air line and, as in the previously described embodiment, this nipple-like portion and the tape portion 21a are elastic to permit stretching of the nipple to accommodate different sizes of fittings and to permit the tape portion to be wrapped under tension so as to seal the attachment to the tube under a pressure capable of withstanding the testing pressures.

From the foregoing it will be appreciated that the present attachment affords an inexpensive appliance for connecting the chambers of the tube to a testing air line and one that can be used for testing tubes of different sizes or with testing lines having end fittings of different sizes. Also, the attachment can be applied or installed on the tube, and sealed against the surface of the tube, with a minimum of effort and time and without the use of any cumbersome appurtenances.

What I claim is:

1. An attachment for connecting a test hose line to the air entry of a Pitot-static tube comprising a tubular body portion having a tapering interior forming an air passage therein, an elongated extension merging into and formed integrally with said body portion of sufficient length to be wrapped in a series of convolutions around said tube, and means on said extension for retaining said convolutions on the tube.

2. An attachment for connecting a test hose line to the air entry opening of a Pitot-static tube comprising an elastic, tubular body portion having an air passage therein adapted to be positioned in registry with said tube opening, an elastic extension formed integrally with said body portion of sufficient length to be wrapped under tension in a series of convolutions around said tube to form an air tight seal between said attachment and tube capable of withstanding the pressures used in testing said tube, and means for retaining said convolutions under tension around said tube.

3. An attachment for connecting a test hose line to the air entry opening of a Pitot-static tube consisting of an elastic strip of rubber of tape-like formation with a tubular air passage formed adjacent one end thereof, and fastening elements on its opposite sides at the other end thereof, whereby said air passage may be positioned in registry with the tube opening and said tape-like strip secured around the tube in a series of tensioned convolutions.

4. An attachment for connecting a test hose line to the air entry opening of a Pitot-static tube consisting of an elastic tape of rubber having an integrally formed, elastic tubular member adjacent one end thereof, said tubular member having an air passage extending therethrough adapted to be positioned in registry with said tube opening, and means for securing said tape around the tube in a series of convolutions under tension to form a seal between said attachment and tube capable of withstanding the pressures used in testing said tube.

5. An attachment for connecting a test hose line to the air entry opening of the static chamber of a Pitot-static tube, said attachment consisting of an elastic tape, a tubular projection on one face of said tape constituting an air passage adapted to be positioned in registry with said entry opening, and means for securing said tape around said tube.

6. An attachment for connecting a test hose line to the air entry opening of the dynamic pressure chamber of a Pitot-static tube, said attachment consisting of a flat elastic tape having an integral tubular body portion projecting laterally from one end thereof with the end of said tubular portion remote from the tape formed with an opening of reduced cross-section, and means for securing said tape around the Pitot-static tube.

7. An attachment for connecting a test hose line to the open end of a Pitot-static tube and in communication with the dynamic pressure chamber of said tube, said attachment consisting of an elastic tapering tubular body portion adapted to be inserted over the open end of said tube, an elastic tape-like extension formed integral with and normally arranged tangentially to said tubular body portion, and means carried on the extension for securing said extension around said tube.

8. An attachment for connecting a test hose line to the tapered open end of a Pitot-static tube and for sealing the air entry openings to the static chamber of said tube, said attachment consisting of an elastic tubular body portion adapted to be telescoped over the open end of said tube and of sufficient length to seal said openings to the static chamber, the interior of said tubular body being tapered to form a reduced end portion for attachment to the tapered end of said tube and means integral with said tubular body for securing the same on said tube under a pressure capable of withstanding the pressures used in testing said tube.

9. An attachment for connecting a test hose line to the tapered open end of a Pitot-static tube and for sealing the air entry openings to the static chamber of said tube, said attachment consisting of a tapered elastic tubular body portion adapted to be telescoped over the tapered open end of said tube and of sufficient length to seal said openings to the static chamber, an elastic tape formed integral with said tubular body, and means for securing said tape around said tube.

WILLIAM H. JORDAN.